(No Model.)
J. RELLSTAB & J. CROSSLEY.
COUPLING FOR WATER CLOSETS.
No. 552,144. Patented Dec. 31, 1895.
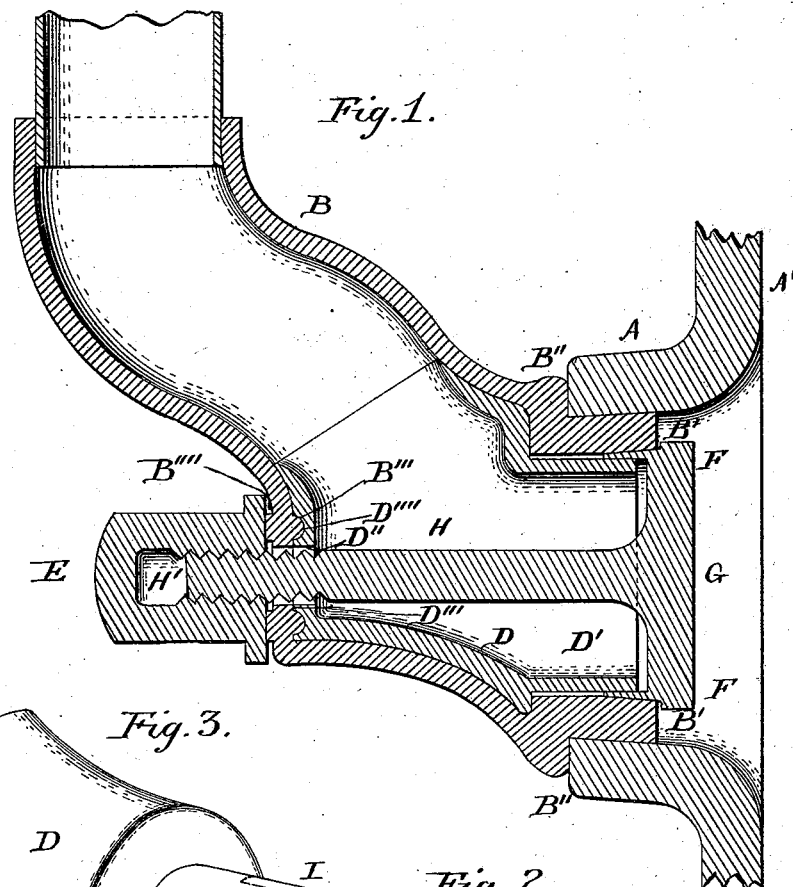
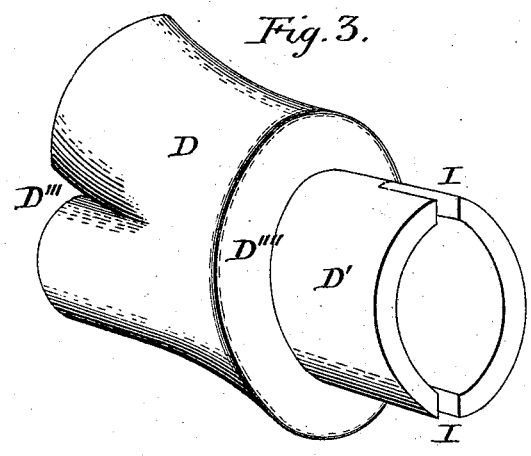
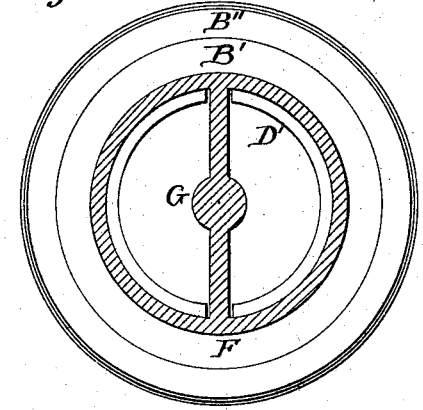
Witnesses:
Edward W. Lee
William S. Mills
Inventors
John Rellstab
Joseph Crossley
per
James Buchanan
Attorney.

UNITED STATES PATENT OFFICE.

JOHN RELLSTAB AND JOSEPH CROSSLEY, OF TRENTON, NEW JERSEY.

COUPLING FOR WATER-CLOSETS.

SPECIFICATION forming part of Letters Patent No. 552,144, dated December 31, 1895.

Application filed March 30, 1894. Serial No. 505,674. (No model.)

*To all whom it may concern:*

Be it known that we, JOHN RELLSTAB and JOSEPH CROSSLEY, citizens of the United States of America, residing at Trenton, in the county of Mercer and State of New Jersey, have invented certain new and useful Improvements in Couplings for Water-Closets, of which the following is a specification, reference being had therein to the accompanying drawings.

Our invention relates to that class of couplings which connect the vent and water-supply pipe with the bowl or basin of a water-closet. These bowls or basins are made of porcelain or earthenware, and are flushed by means of a stream of water conducted to them from the supply-pipe by means of a coupling. Hitherto these couplings as made have proved in practice unsatisfactory. Some are provided with spurs entering cavities within the horn of the bowl and rigidly fastened therein by a bushing or filling of sulphur. In time this sulphur, by the action of the water thereon, expands and bursts the horn, and the horn being made in one with the bowl the whole bowl is rendered useless by such bursting. Again, the bowl being supported upon a base resting upon timbers or the floor, and the supply-pipe being fixed rigidly in place, it has often happened that with the use of a rigid coupling by the sinking of the timber underneath the base and the consequent settling of the bowl, the horn has been split off, and thus the whole bowl rendered useless. We remedy these evils by the use of a flexible coupling fastened within the horn by means which dispense with the use of sulphur, and which afford flexibility even to the joint within the horn.

Our invention is shown more clearly in the annexed drawings. In the drawings similar parts are indicated by similar letters of reference.

Figure 1 shows a view in section of our invention. Fig. 2 shows a front view thereof before attachment to the bowl. Fig. 3 shows a view in perspective of the metal reinforce.

In Fig. 1 A is the horn attached to and made in one with the body of the bowl or basin A'. This bowl being the ordinary bowl or basin, only that portion to which the horn is attached is shown.

B is the coupling connecting supply-pipe C with bowl A'. This coupling is made of rubber or other flexible substance, and ends in extension-tube B' adapted to enter horn A, and is provided with shoulder B'' adapted to abut against the end of the horn. Within this flexible coupling is placed a rigid metal reinforce adapted to the shape of the coupling and provided with an extension or tube D', which extends within tube B' of the coupling B. At the other end this reinforce is provided with opening D'' through the plane D'''. In this plane is annular groove D''''. Over this plane the coupling B fits closely. It is provided with annular bead B''' which, fitting within the groove D'''', keeps the parts in proper position. It is also provided with an annular projection B'''', which forms a seat for screw-nut E. Surrounding tube D' is a ring F. This ring is thicker at its outer edge or end than it is on its inner edge or end, and thus forms an annular wedge. Across this ring, and preferably made in one therewith, is a bar G. Formed preferably in one with this bar is a short rod or reach H ending within the screw-nut E in the screw-threaded end H'. The ring F has shoulders adapted to abut against B'.

In Fig. 2, which is a front view of the rubber tube B', the shoulders B'', and metal tube D', F is the wedge-ring and G the cross-bar, to which is attached the rod H. In Fig. 3, which is a view in perspective of the metal reinforce D, D' is the metal tube or extension, D'''' is the plane, and D''''' is an annular shoulder which serves to keep the reinforce in place within the coupling B and to sustain the rubber shoulders B''. In the tube or extension D' are two slots I I adapted to receive the bar G, and in which the bar can play freely backward and forward. I have figured and described a bar and two slots, but I prefer to use three slots and a Y instead of a bar, but the number of slots and the exact shape of the connection between the rod H and wedge-ring F are not material.

The action of our mechanism is as follows: It being desired to connect a vent or supply-pipe C with a bowl or basin A', the screw-nut E is unscrewed so far as to permit the wedge-ring F to pass almost entirely out from between the metal tube D' and the rubber tube B', thus reducing the outer diameter of the rubber tube B'. The tube B' is then inserted up to the shoulders D'' within a horn A. The screw-nut E rests against the rubber seat B''', which acts as a washer upon the metal plane D'''. The nut is then turned. This by means of the screw-threaded end H' brings forward the rod H and bar G, and thereby causes the wedge-ring F to enter farther and farther between the metal tube D' and the rubber tube B', and the wedge-ring F having a wedging action, as it is brought forward it expands the rubber tube B' and presses it tightly against the inner diameter of the horn A and thus forms a firm and tight joint. It will be readily seen that the extent of this wedging action and consequent tightening of the joint is limited only by the number of turns given the nut E. As considerable screw-space is given, this rubber tube B' can be adjusted equally as well to horns having a considerable variation in inner diameter. Again, as the tube B' is of rubber, it adapts itself readily to inequalities in the inner surface of the horn or to any variance therein from a true round.

By our means not only is the use of spuds entirely done away with, and we dispense with the deleterious sulphur-washing used in other horns, but we also dispense entirely with the necessity of the labor and expense of forming within the horn the various cams, slots, lips, and other contrivances which are so difficult to make and so liable to be spoiled in firing, but are needed in other forms of coupling, and we also secure a joint which, while tight and tenacious, has yet flexibility enough to avoid injury to the horn by a settling of the bowl. In fact this injury is absolutely avoided by our use of the rubber coupling.

Many other advantages will occur to the users of such articles—such as ease of affixing and removal, simplicity of operation, security of joint, &c.

What we claim as our invention, and desire to secure by Letters Patent, is—

1. In a coupling for a water-closet, a flexible coupling B. provided with an extension tube B'. in combination with the reinforce D. placed inside said tube, and the wedge ring F. adapted to enter between said tube and reinforce, substantially as shown and described.

2. In a coupling for a water-closet, a flexible coupling B. provided with shoulders B''. and an extension tube B'. in combination with the reinforce D. placed inside said tube and the wedge ring F. adapted to enter between said tube and reinforce, substantially as shown and described.

3. In a coupling for a water-closet, a flexible coupling B. provided with extension tube B'. in combination with the reinforce D. having tube D'. placed within said coupling, and a wedge ring adapted to enter between extension tube B'. and tube D'. substantially as shown and described.

4. In a coupling for a water-closet, the flexible coupling B. provided with extension tube B'. in combination with the reinforce D. within said coupling, and provided with metal tube D'. and the wedge ring F. adapted to enter between said extension tube B'. and the tube D'. such wedge ring provided with bars G. and H. and screw nut E. substantially as shown and described.

5. In a coupling for a water-closet, the flexible coupling B. provided with shoulders B''. and extension tube B'. and reinforce D. inside the same, having metal tube D'. in combination with wedge ring adapted to enter B'. and carrying bar G. and rod H. provided with screw end H'. and nut E. substantially as shown and described.

6. In a coupling for a water-closet, the flexible coupling B. provided with extension tube B'. and seat B'''. and a reinforce D. placed inside said coupling, and provided with tube D'. and plane D'''. in combination with the wedge ring F. adapted to enter extension tube B'. and provided with bar G. and a rod H. carrying screw end H'. and nut F. substantially as shown and described.

7. In a coupling for a water closet a flexible coupling provided with an extension tube adapted to enter the horn of a bowl, in combination with a metal reinforce, bearing also an extension tube of metal within the flexible extension tube, and a wedge ring adapted to enter between the two extension tubes, and by its entrance to press the outer tube against the inner surface of the horn, substantially as shown and described.

8. In a coupling for a water-closet, a flexible coupling adapted to enter the horn of the bowl, and provided with a metal reinforce placed within said coupling and entering also within the horn, in combination with a wedge ring adapted to enter between the inner ends of such coupling and reinforce, and provided with means to force such wedge ring between said ends, and thus press the outer circumference of the end of the coupling within the horn firmly against the inner circumference of the horn, substantially as shown and described.

In testimony whereof we have affixed our signatures in presence of two witnesses.

JOHN RELLSTAB.
JOSEPH CROSSLEY.

Witnesses:
PETER W. CROZER,
EDWARD W. LEE.